J. B. RAWLINGS.
DIRECTION SIGNAL FOR VEHICLES.
APPLICATION FILED JUNE 26, 1919.
1,369,354.
Patented Feb. 22, 1921.
3 SHEETS—SHEET 3.
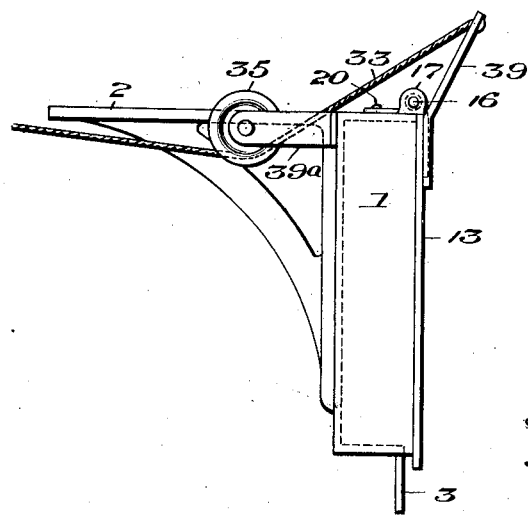
Fig. 5.
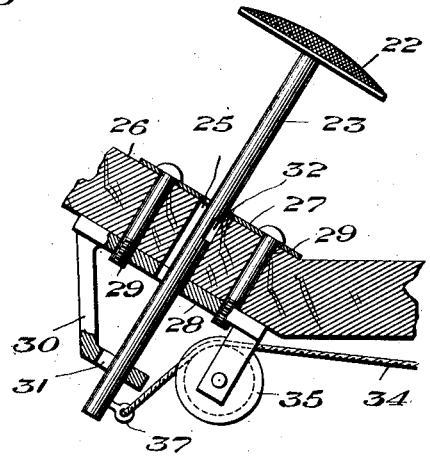
Fig. 7.
Fig. 6.
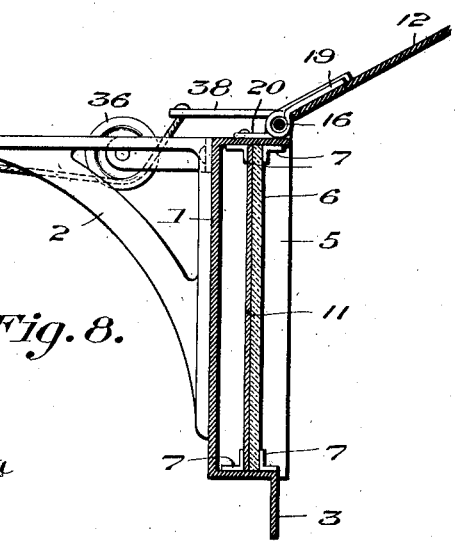
Fig. 8.
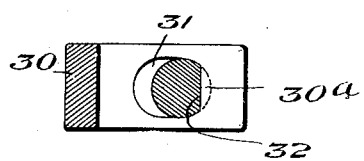
Fig. 9.
Witness
Philip E. Barnes
Inventor
Joe B. Rawlings
By
his Attorney

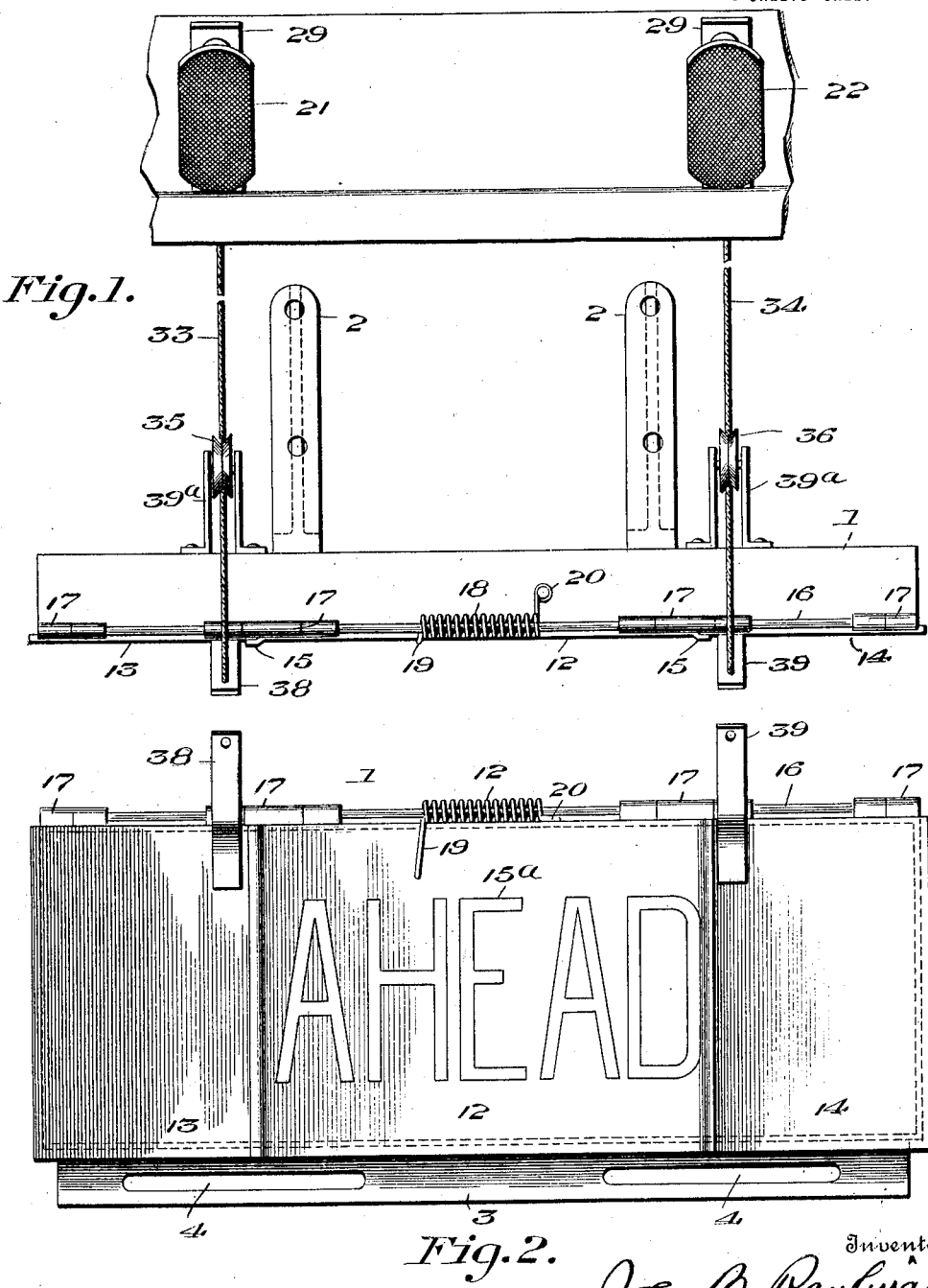

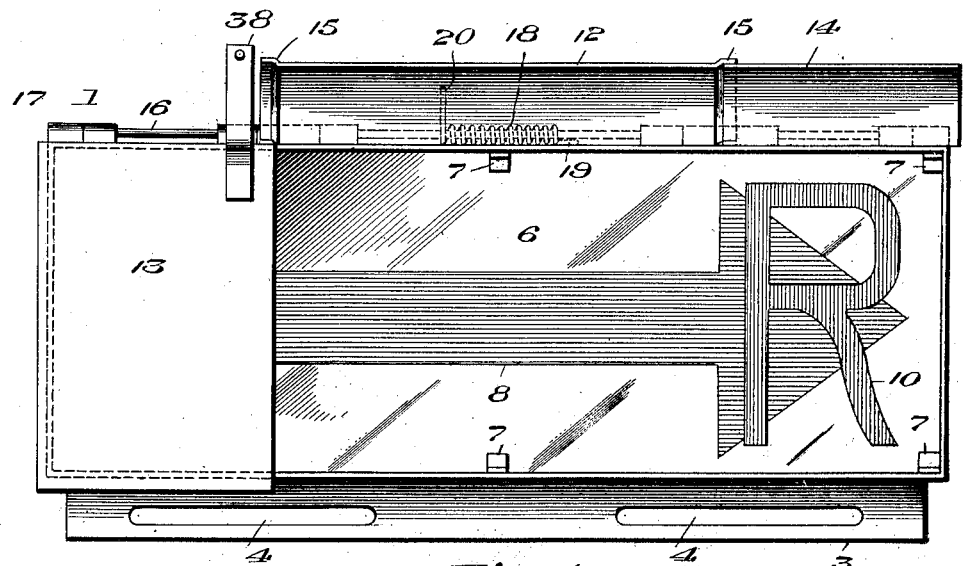
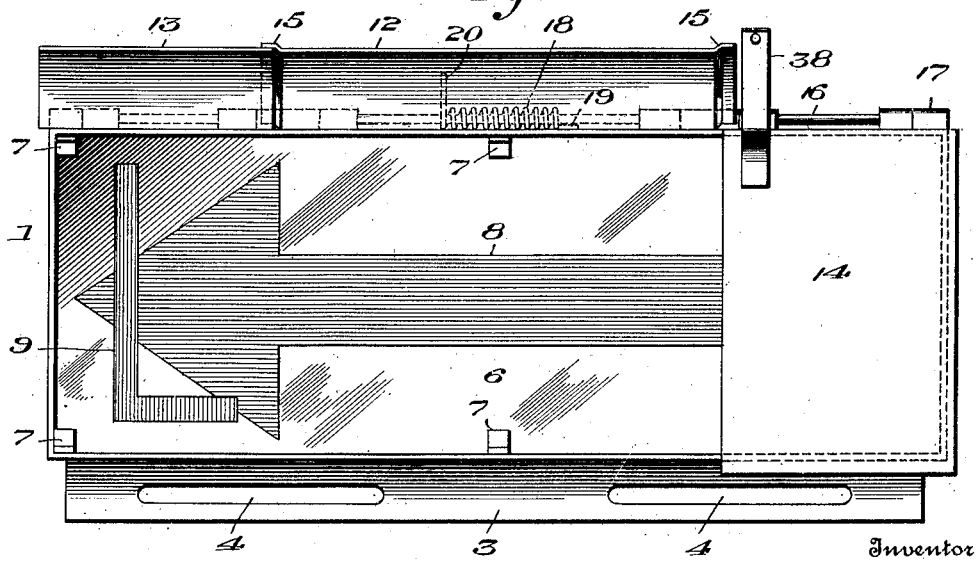

UNITED STATES PATENT OFFICE.

JOE B. RAWLINGS, OF MEMPHIS, TENNESSEE.

DIRECTION-SIGNAL FOR VEHICLES.

1,369,354.  Specification of Letters Patent.  Patented Feb. 22, 1921.

Application filed June 26, 1919. Serial No. 306,895.

*To all whom it may concern:*

Be it known that I, JOE B. RAWLINGS, a citizen of the United States, residing at Memphis, in the county of Shelby and State of Tennessee, have invented certain new and useful Improvements in Direction-Signals for Vehicles, of which the following is a specification.

This invention relates to direction signals for vehicles such as buggies, wagons, trucks and automobiles.

One of the objects of my invention is the provision of a signal of the character set forth which will be purely mechanical, thereby eliminating electric lights, switches, electro-magnets, and other expensive, easily disarranged and difficult to install operating devices such as have heretofore been proposed for use in connection with direction signals for vehicles.

My improved direction signal contemplates, first, the provision of a signal box or direction indicator so constructed that light derived from the lamps on a car or vehicle which is following the vehicle having my signal, will illuminate my signal and, thus, it becomes unnecessary to use an electric or other lamp or source of illumination at night for the display of my signal. On the other hand, during the day time, my signal is illuminated by sun light and clearly visible.

The principle involved in the illumination of my signal, either by natural light or the light derived from the lamps on the vehicle which is following the car or vehicle carrying my signal, is that of reflection. The signs or indicia or signaling characters are carried by a ground glass which has a reflecting surface behind it. The reflecting surface may be a mirror of glass or piece of metal having a reflecting surface, or, the ground glass may be provided with a mirrored or silvered surface. Being ground on one side and mirrored on the other side, the glass bearing the signal indications does not reflect a glare but, on the contrary, gives forth a soft light, and the signal indications stand out plainly in both day time and at night.

My invention also embodies a signal wherein a main or master door representing "ahead", controls doors which cover indicia or signal means depresenting right and left so that the normal condition of the normal condition of the signal is that which represents a direct ahead or forward movement of the vehicle, which, however, is subject to change of operation of one of the other of the doors which cover and uncover the signal indications for "right" and "left".

Another feature of my invention is an improved pedal or foot control for the doors which govern the display of the right and left signals, the construction and arrangement being such that the pedals, the main signal, and the operative mechanical connections may be quickly and easily installed on any vehicle. The foot control embodies a novel arrangement of parts whereby it is rendered self locking, subject to quick and easy release. In that respect there is a co-operative relation between the self-closing master door of the signal and the pedal control. The master door is spring-actuated and arranged to coöperate with the remaining doors and the pull of the operative connections between the doors and the pedal controls, under the influence of the spring-actuation of the master door, in connection with the peculiar arrangement of said connections, results in the automatic locking of the foot controls, once they have been depressed. This results in the signal remaining in the condition in which it is set, until changed by the driver of the vehicle.

The invention is susceptible of modification in various respects without departing from the general principles thereof, and consequently the disclosure hereinafter given and which appears in the accompanying drawings, is to be considered as illustrative, rather than restrictive, of the scope of the invention.

In the accompanying drawings,

Figure 1 is a plan view of the complete invention with the pedal controls and the signal in their position for use, the operating cords being broken away and the signal being in normal ahead condition;

Fig. 2 a rear elevation of the signal box in ahead condition;

Fig. 3 a similar view with the master door and "right" door raised, indicating that a turn is to be made to the right;

Fig. 4 a similar view, showing the master door and "left" door raised, indicating that a turn is to be made to the left;

Fig. 5 a view looking toward the left hand end of Fig. 2;

Fig. 6 a detail view, partly in section, showing one of the pedals depressed and locked;

Fig. 7 a similar view showing the pedal in its raised position, as when the door control thereby is closed;

Fig. 8 a vertical section on line 8—8 of Fig. 3, showing the doors raised, and

Fig. 9 a detail cross section through the bracket and stem of one of the pedals, illustrating the manner of locking the stem of the pedal.

The signal proper is a box-like form as shown at 1, provided with brackets 2 at its back for its attachment to the vehicle. It may also be provided with a depending flange 3 having slots 4 for the attachment of the number plate or tag. The brackets 2 may be varied to adapt the device for attachment to different makes of vehicles and automobiles. The box 1 has an open front 5 and is provided with a ground glass 6 held by suitable clips or fastening devices 7. The ground glass 6 is provided with suitable indicia or signal indications. For instance, a double headed arrow 8 is painted or provided on the ground glass 6 and the letters "L" and "R" shown at 9 and 10, respectively, are also provided on the ground glass 6.

The principle of illumination of my signal is that of reflection. There is provided at the back of the ground glass 6 a reflecting medium 11. This may be a mirror of glass or of bright metal, or any kind of a reflecting back-ground or mirror may be provided on the ground glass 6 or even in the rear thereof. I do not limit myself to the particular construction or embodiment of the reflecting medium which is employed. It is within the spirit of the invention to use ordinary glass, instead of ground glass, for the glass plate 6. I prefer ground glass because it reflects the light without any glare and yet the signal indicia 8, 9, 10, or, whatever indicia may be employed, appear very distinctly either in natural light or are brought out by rays of light coming from the lamps of a vehicle which may be following the vehicle carrying my signal. By utilizing reflected light for purposes of illumination, I obviate the use of lamps or electric lights, such as have heretofore been employed in connection with car signals and, in the case of electric lights, dispense with switches and wiring systems.

The open front 5 and the glass 6 are normally covered by a master door 12 and left and right doors 13 and 14. The master door bears, or may have stenciled or cut therein, any suitable word or indication such, for instance, as the word "ahead" shown at 15, or a red glass bull's-eye to be used as a tail-light also lighted by reflection so that when the doors are closed, a vehicle or car approaching from the rear will know that the car bearing my signal is proceeding directly ahead. The doors 13 and 14 cover the indicia 9, 10. The master door 12 overlaps the doors 13, 14 as shown at 15, suitable flanges being provided at the side edges of the door 12. All of the doors are hung on a suitable hinge rod 16 carried by ears 17 on the box 1. A suitably strong spring 18 is coiled around the rod 16 and bears against the door 12 at 19 and against the box 1 at the point 20. The spring 18 keeps the door 12 closed and, with it, the doors 13 and 14 when the pedals 21 and 22 which control the doors 13 and 14, respectively, are in their raised position as shown in Figs. 1 and 7. When the pedal 22 is depressed, as illustrated in Fig. 6, for instance, the door 14 will be raised and will lift the door 12 against the action of the spring 18, but the door 13 will remain down. When the pedal 21 is depressed to the position shown in Fig. 6, the door 13 will be raised and will lift the door 12, the door 14 then remaining down.

Referring to Figs. 6, 7 and 9, the pedals which comprise a stem 23 have a suitable head 24 are slidable through an opening 25 in the foot board 26 of the car or vehicle. Suitable wear plates 27, 28 connected by bolts 29 are provided. Attached to or formed integral with the plate 28 is a bracket 30 which has an elongated or D-shaped slot 31. The stem 23 has a notch 32. When the pedal is depressed, as shown in Fig. 6, the notch 32 receives the part 30$^a$ of the bracket, thus locking the pedal in depressed position, the cords or small chains 33 and 34 connecting the stems 23 of the respective pedals 21, 22 to the doors 13, 14. These cords run over pulleys or sheaves 35, 36 in each instance and are connected to the stem 23 at 37 and to brackets 38, 39, respectively, carried by the doors 13, 14. The pulleys or sheaves 35, 36 are carried by the plate 28 and brackets 39$^a$, respectively.

The axes of the pulleys 35 are so arranged that the pull on the cords 33, 34 due to the tension of the spring 18, draws the stems 23 toward that side or margin of each of the slots 31 which is shown at 30. Consequently, when the stem 23 is depressed, the notch 32 will immediately lock with the part 30 when it comes into register therewith and the tension of the spring 18 will maintain this lock arrangement. The doors which are raised will therefore remain in raised position. The tension of the spring 18 also tends to raise the pedals 21, 22 to the position shown in Fig. 7, once the locking engagement of the part 30 and notch 32 is broken. This engagement of the notch 32 from the part 30 is readily effected by a slight sidewise kick on the stem 23, whereupon the door 12, whichever of the doors 13, 14 has been raised, will close to the position shown in Fig. 2.

The controlling pedals 21, 22 are so arranged that they correspond to the indicia denoting turning to the left and to the right, respectively. Consequently, the natural impulse is to press the pedal 21 when a turn is made to the left, or to press the pedal 22 when a turn is made to the right.

What I claim is:

1. In a direction signal for vehicles, direction indicating means adapted to be displayed or covered, comprising operating doors or shutters for covering the "right" and "left" indications, a spring-closed master door controlling the display of the "ahead" indication, said master door engaging the doors first named, independent shiftable pedals, means for locking said pedals, and operative connections between the pedals and the respective operating doors whereby said doors may be independently opened, said spring-closed master door pulling upon the operative connections aforesaid through the operating doors aforesaid to automatically shift and hold the respective pedals in locked condition when they are operated.

2. In a direction signal for vehicles, the combination with an indicator, and a spring-closed door or shutter therefor, of a depressible controlling pedal having a slidable and laterally shiftable stem provided with means whereby it may be locked when shifted laterally, and an operative connection leading to the stem of the pedal, said operative connection being applied so that it will laterally shift and hold the pedal in locked condition by the pull of the spring-closed door thereon when the pedal is depressed.

3. In a direction signal for vehicles, the combination with an indicator, and a spring-closed door or shutter therefor, of a depressible controlling pedal having a slidable and laterally shiftable stem provided with means whereby it may be locked when shifted laterally, and a flexible operative connection leading to the pedal which has its guiding point and point of connection to the stem of the pedal so arranged that the pull exerted on said flexible connection by the spring actuation of the door will laterally shift and hold the pedal in locked condition when it is depressed and will serve as a raising means for said pedal when it is released.

In testimony whereof I affix my signature.

JOE B. RAWLINGS.